3,130,131
PROCESS FOR THE PRODUCTION OF
STREPTOMYCIN
Hamilton de Lisle King, Somerset, N.J., assignor to Olin
Mathieson Chemical Corporation, New York, N.Y., a
corporation of Virginia
No Drawing. Filed Feb. 27, 1963, Ser. No. 261,503
9 Claims. (Cl. 195—80)

This invention relates to an improved process for the production of streptomycin.

The antibiotic streptomycin is conventionally produced by culturing the microorganism *Streptomyces griseus* in a nutrient medium which provides sources of carbon, nitrogen, nutritional growth factors and minerals under aerobic conditions. After an incubation period of about 6 to 7 days, the broth is harvested and the antibiotic is isolated from the medium.

It is naturally an object to obtain the highest possible yield of streptomycin. The yield of the antibiotic is generally expressed in terms of units of streptomycin per ml. of fermentation broth as assayed by the maltol method [Russo-Alesi et al., Anal. Chem. 31, 1710 (1959)].

It has been found that the addition of small amounts of one or more of the four plant auxins α-naphthaleneacetic acid, α-naphthyloxyacetic acid, phenylacetic acid or 3-indolebutyric acid to the streptomycin fermentation enhances the yield of the antibiotic. In contrast, 3-indoleacetic acid suppresses streptomycin production.

The auxins may be incorporated into the medium in any conventional manner. It is preferred, however, to add the auxin to the otherwise complete medium in alcoholic solution, before the medium is sterilized.

Only very small quantities of the auxin, catalytic in amount, are required to obtain increased production of streptomycin. For example, amounts in the range of about 5 to about 50 parts per million (w./v., i.e., 1 mg. of auxin per ml. of medium) may be used. Preferably about 20 to 35 p.p.m. of auxin is used.

In other respects the process for the production of streptomycin corresponds to those commonly used for the production of this antibiotic. A streptomycin producing strain of *Streptomyces griseus* is incubated at a temperature of about 20° to 35° C., preferably 25° to 27° C., under submerged aerobic conditions in an aqueous nutrient medium containing an assimilable source of carbon, nitrogen and energy, e.g., carbohydrates such as starch, dextrin or sugars such as maltose, lactose or glucose, peptones or soybean meals. The fermentation is continued for about 144 to about 168 hours at a pH of about 7.0 to 8.0. The streptomycin is recovered by conventional means, such as absorption on resin and elution therefrom.

The following examples are illustrative of the process of the invention and the improved results achieved.

EXAMPLE 1

An inoculum was prepared from a lyophilized culture of *Streptomyces griseus* in a Nutrisoy Flour medium contained in a 250 ml. Erlenmeyer flask. The medium was made up as follows: Toasted Nutrisoy Flour (soybean extract flour, Archer-Daniels, Midland Co.), 50 gms., cornsteep liquor, 8.0 ml., sodium chloride, 5.0 g., distilled water to 1.0 liter, pH 7.0 to 7.1, sterilized at 120° C. for 30 minutes. The culture was incubated on a rotary shaker (280 rev./min., 2″ rad.) at 25° C. for 48 hours. After the incubation of the first stage, two 10% (by vol.) transfers were made to a Nutrisoy-Cerelose medium in 250 ml. Erlenmeyer flasks. The medium was made up as follows: Toasted Nutrisoy Flour, 15 gms., Cerelose (glucose monohydrate), 22 gms., sodium chloride, 5.0 gms., distilled water to 1.0 liter, pH 6.8 to 7.2, sterilized at 121° C. for 30 minutes. The cultures were incubated for 24 hours at 25° C. on a rotary shaker as described above.

A 1.5 ml. inoculum from the above was introduced into each of forty 250 ml. Erlenmeyer flasks each containing 25 ml. of a medium composed of 6.0% Toasted Nutrisoy Flour, 6.5% Cerelose, 0.6% sodium sulfate and 0.04% lard oil in water. The concentration of α-naphthaleneacetic acid indicated in the following table were incorporated in the medium in an alcoholic solution before sterilization (except for the control). The flasks were incubated for 6 days at 25° C. on a rotary shaker (280 rev./min., 2″ rad.). At the end the fermentation broth was assayed for streptomycin activity by the maltol method.

The following results were obtained:

Table I.—α-Naphthaleneacetic Acid

| Conc., p.p.m. | Streptomycin production (u./ml.) | Percent increase |
|---|---|---|
| 5 | 5,850 | 8.71 |
| 10 | 5,783 | 7.47 |
| 15 | 5,870 | 9.08 |
| 20 | 5,996 | 11.42 |
| 25 | 6,358 | 18.15 |
| 30 | 6,033 | 12.11 |
| 35 | 6,133 | 13.97 |
| 40 | 5,681 | 5.57 |
| Control | 5,381 | |

EXAMPLE 2

The process described in Example 1 was followed except that α-naphthyloxyacetic acid was incorporated in the medium in the concentration indicated instead of α-naphthaleneacetic acid.

The following results were obtained:

Table II.—α-Naphthyloxyacetic Acid

| Conc., p.p.m. | Streptomycin production (u./ml.) | Percent increase |
|---|---|---|
| 5 | 5,706 | 5.40 |
| 10 | 5,901 | 8.90 |
| 15 | 5,682 | 4.93 |
| 20 | 5,941 | 9.71 |
| 25 | 5,887 | 8.71 |
| 30 | 6,005 | 10.90 |
| 35 | 6,090 | 12.46 |
| 40 | 5,931 | 9.52 |
| 50 | 5,955 | 9.97 |
| Control | 5,415 | |

EXAMPLE 3

The procedure of Example 1 was followed except that 3-indolebutyric acid was substituted for the α-naphthalene-acetic acid.

The following results were obtained:

Table III.—3-Indolebutyric Acid

| Conc., p.p.m. | Streptomycin production (u./ml.) | Percent increase |
|---|---|---|
| 5 | 6,510 | 4.3 |
| 10 | 6,558 | 5.0 |
| 15 | 6,450 | 3.3 |
| 20 | 6,508 | 4.2 |
| 25 | 6,908 | 10.4 |
| 30 | 6,883 | 10.3 |
| 35 | 7,140 | 14.4 |
| 40 | 7,033 | 11.1 |
| 50 | 6,568 | 5.2 |
| Control | 6,240 | |

Similarly, phenylacetic acid stimuated streptomycin production in significant amounts in concentrations of 20 p.p.m. and above.

What is claimed is:

1. A process for the production of streptomycin which comprises culturing the microorganism *Streptomyces griseus* in a nutrient medium containing a source of carbon, nitrogen, nutritional cofactors and minerals, and an auxin of the group consisting of α-naphthaleneacetic acid, α-naphthyloxyacetic acid, phenylacetic acid and 3-indolebutyric acid, under aerobic conditions.

2. A process as in claim 1 wherein the proportion of auxin is about 5 to about 50 parts per million, wt./vol.

3. A process as in claim 2 wherein the auxin is α-naphthaleneacetic acid.

4. A process as in claim 2 wherein the auxin is α-naphthyloxyacetic acid.

5. A process as in claim 2 wherein the auxin is phenylacetic acid.

6. A process as in claim 2 wherein the auxin is 3-indolebutyric acid.

7. In the preparation of streptomycin by fermentation with *Streptomyces griseus*, the improvement which comprises incorporating in the fermentation medium an auxin of the group consisting of α-naphthaleneacetic acid, α-naphthyloxyacetic acid, phenylacetic acid and 3-indolebutyric acid.

8. A process as in claim 7 wherein the proportion of auxin is about 5 to about 50 parts per million, wt./vol.

9. A process as in claim 7 wherein the proportion of auxin is about 20 to 35 parts per million, wt./vol.

References Cited in the file of this patent

UNITED STATES PATENTS

| | | |
|---|---|---|
| 2,423,873 | Coghill et al. | July 15, 1947 |
| 2,449,866 | Waksman et al. | Sept. 21, 1948 |